(12) United States Patent
Sharkey

(10) Patent No.: US 10,063,813 B2
(45) Date of Patent: Aug. 28, 2018

(54) METHOD AND SYSTEM FOR COMMUNICATING AND DISPLAYING BROADBAND CONTENT AVAILABILITY USING INFORMATION RECEIVED THROUGH A SATELLITE

(75) Inventor: Jeffrey L. Sharkey, Hermosa Beach, CA (US)

(73) Assignee: The DIRECTV GROUP, INC., El Segundo, CA (US)

( * ) Notice: Subject to any disclaimer, the term of this patent is extended or adjusted under 35 U.S.C. 154(b) by 837 days.

(21) Appl. No.: 11/828,494

(22) Filed: Jul. 26, 2007

(65) Prior Publication Data

US 2009/0031356 A1    Jan. 29, 2009

(51) Int. Cl.
| | |
|---|---|
| H04N 7/20 | (2006.01) |
| H04N 7/173 | (2011.01) |
| H04N 21/2389 | (2011.01) |
| H04N 21/262 | (2011.01) |
| H04N 21/266 | (2011.01) |
| H04N 21/61 | (2011.01) |

(52) U.S. Cl.
CPC ..... *H04N 7/17336* (2013.01); *H04N 21/2389* (2013.01); *H04N 21/26291* (2013.01); *H04N 21/26603* (2013.01); *H04N 21/6143* (2013.01)

(58) Field of Classification Search
CPC .......... H04N 2005/44547; H04N 2005/44556; H04N 2005/44565; H04N 21/482; H04N 21/4821; H04N 5/44543; H04N 21/44204; H04N 21/44222; H04N 21/4755; H04N 21/436; H04N 21/64707; H04N 21/236; H04N 21/4725; H04N 21/858; H04N 21/85; H04N 7/17336; H04N 7/20; H04N 21/6143; H04N 21/4622; H04N 21/84; H04N 21/435; H04N 21/235; H04B 7/18523; H04H 40/90
USPC ..... 725/39, 40, 41, 92, 93, 95, 96, 109, 110, 725/114, 116; 370/238; 709/226, 227, 709/203, 246
See application file for complete search history.

(56) References Cited

U.S. PATENT DOCUMENTS

| | | | |
|---|---|---|---|
| 5,548,532 A * | 8/1996 | Menand et al. | 370/477 |
| 5,850,218 A * | 12/1998 | LaJoie et al. | 725/45 |
| 5,907,323 A * | 5/1999 | Lawler et al. | 725/41 |
| 5,920,700 A | 7/1999 | Gordon et al. | |
| 6,357,043 B1 * | 3/2002 | Ellis et al. | 725/61 |
| 6,515,680 B1 | 2/2003 | Hendricks et al. | |
| 6,681,395 B1 | 1/2004 | Nishi | |
| 6,741,834 B1 * | 5/2004 | Godwin | H04H 20/103 348/E5.105 |
| 6,983,478 B1 | 1/2006 | Grauch et al. | |
| 7,634,789 B2 | 12/2009 | Gerba et al. | |
| 7,724,900 B2 * | 5/2010 | Soda | 380/200 |

(Continued)

FOREIGN PATENT DOCUMENTS

WO    WO 2007144823 A1 *  12/2007    ..... H04N 21/234318

*Primary Examiner* — Ngoc K Vu
(74) *Attorney, Agent, or Firm* — Harness, Dickey & Pierce, PLC

(57) ABSTRACT

A communication system 100 includes a content management system 221 determining broadband content availability, and a transport processing system 250 dividing the broadband content availability into broadband content availability packets. The transport processing system 250 communicates the broadband availability packets to a user device through a satellite 106 or 108.

31 Claims, 6 Drawing Sheets

(56) References Cited

U.S. PATENT DOCUMENTS

| | | | |
|---|---|---|---|
| 2002/0015093 A1* | 2/2002 | Dureau | H04N 21/235 348/38 |
| 2002/0023021 A1 | 2/2002 | De Souza | |
| 2002/0023132 A1 | 2/2002 | Tornabene | |
| 2002/0049980 A1 | 4/2002 | Hoang | |
| 2002/0052938 A1 | 5/2002 | Kanemitsu | |
| 2002/0073424 A1 | 6/2002 | Ward et al. | |
| 2002/0087970 A1 | 7/2002 | Dorricott et al. | |
| 2002/0120945 A1 | 8/2002 | Schwalb | |
| 2002/0124182 A1 | 9/2002 | Bacso et al. | |
| 2002/0128029 A1* | 9/2002 | Nishikawa | H04H 20/76 455/517 |
| 2002/0138834 A1 | 9/2002 | Gerba et al. | |
| 2002/0143791 A1 | 10/2002 | Levanon et al. | |
| 2002/0143976 A1 | 10/2002 | Barker et al. | |
| 2002/0171686 A1 | 11/2002 | Kamen et al. | |
| 2003/0009758 A1 | 1/2003 | Townsend et al. | |
| 2003/0084449 A1 | 5/2003 | Chane et al. | |
| 2003/0097661 A1 | 5/2003 | Li et al. | |
| 2003/0115601 A1 | 6/2003 | Palazzo et al. | |
| 2003/0121047 A1* | 6/2003 | Watson et al. | 725/93 |
| 2003/0126595 A1 | 7/2003 | Sie et al. | |
| 2003/0177495 A1* | 9/2003 | Needham et al. | 725/55 |
| 2003/0229900 A1 | 12/2003 | Reisman | |
| 2004/0006768 A1 | 1/2004 | Deshpande et al. | |
| 2004/0133923 A1 | 7/2004 | Watson et al. | |
| 2004/0148638 A1 | 7/2004 | Weisman et al. | |
| 2004/0237114 A1 | 11/2004 | Drazin | |
| 2004/0261098 A1 | 12/2004 | Macrae et al. | |
| 2005/0014463 A1 | 1/2005 | Shin | |
| 2005/0160458 A1 | 7/2005 | Baumgartner | |
| 2005/0193425 A1 | 9/2005 | Sull et al. | |
| 2005/0278760 A1 | 12/2005 | Dewar et al. | |
| 2006/0085814 A1* | 4/2006 | Okamoto et al. | 725/29 |
| 2006/0101496 A1 | 5/2006 | Syed | |
| 2006/0116926 A1 | 6/2006 | Chen | |
| 2006/0129458 A1 | 6/2006 | Maggio | |
| 2006/0183547 A1 | 8/2006 | McMonigle | |
| 2006/0184989 A1 | 8/2006 | Slothouber | |
| 2006/0242683 A1 | 10/2006 | Medford et al. | |
| 2006/0271973 A1 | 11/2006 | Jerding et al. | |
| 2007/0053513 A1 | 3/2007 | Hoffberg | |
| 2007/0107014 A1 | 5/2007 | Howard et al. | |
| 2007/0186230 A1 | 8/2007 | Foroutan | |
| 2007/0250901 A1 | 10/2007 | McIntire et al. | |
| 2007/0288963 A1* | 12/2007 | Ahmad-Taylor et al. | 725/46 |
| 2008/0022298 A1 | 1/2008 | Cavicchia | |
| 2008/0022310 A1 | 1/2008 | Poling | |
| 2008/0072035 A1* | 3/2008 | Johnson | H04L 63/0428 713/153 |
| 2008/0098450 A1 | 4/2008 | Wu et al. | |
| 2008/0155628 A1 | 6/2008 | Soukup et al. | |
| 2009/0031338 A1 | 1/2009 | Sharkey | |
| 2009/0055868 A1* | 2/2009 | Wehmeyer | H04N 5/44543 725/40 |

\* cited by examiner

METHOD AND SYSTEM FOR COMMUNICATING AND DISPLAYING BROADBAND CONTENT AVAILABILITY USING INFORMATION RECEIVED THROUGH A SATELLITE

TECHNICAL FIELD

The present disclosure relates to a content processing and delivery system and, more specifically, to a system for communicating broadband content availability through a satellite.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

SUMMARY

The present disclosure provides a method for communicating the availability of content and other content information to a user device.

In one aspect of the disclosure, a method includes determining broadband content availability data, dividing the broadband content availability into broadband content availability packets, and communicating the plurality of broadband availability packets to a user device through the satellite.

In another aspect of the disclosure, a communication system includes a content management system determining broadband content availability, and a transport processing system dividing the broadband content availability into broadband content availability packets. The transport processing system communicates the plurality of broadband availability packets to a user device through a satellite.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
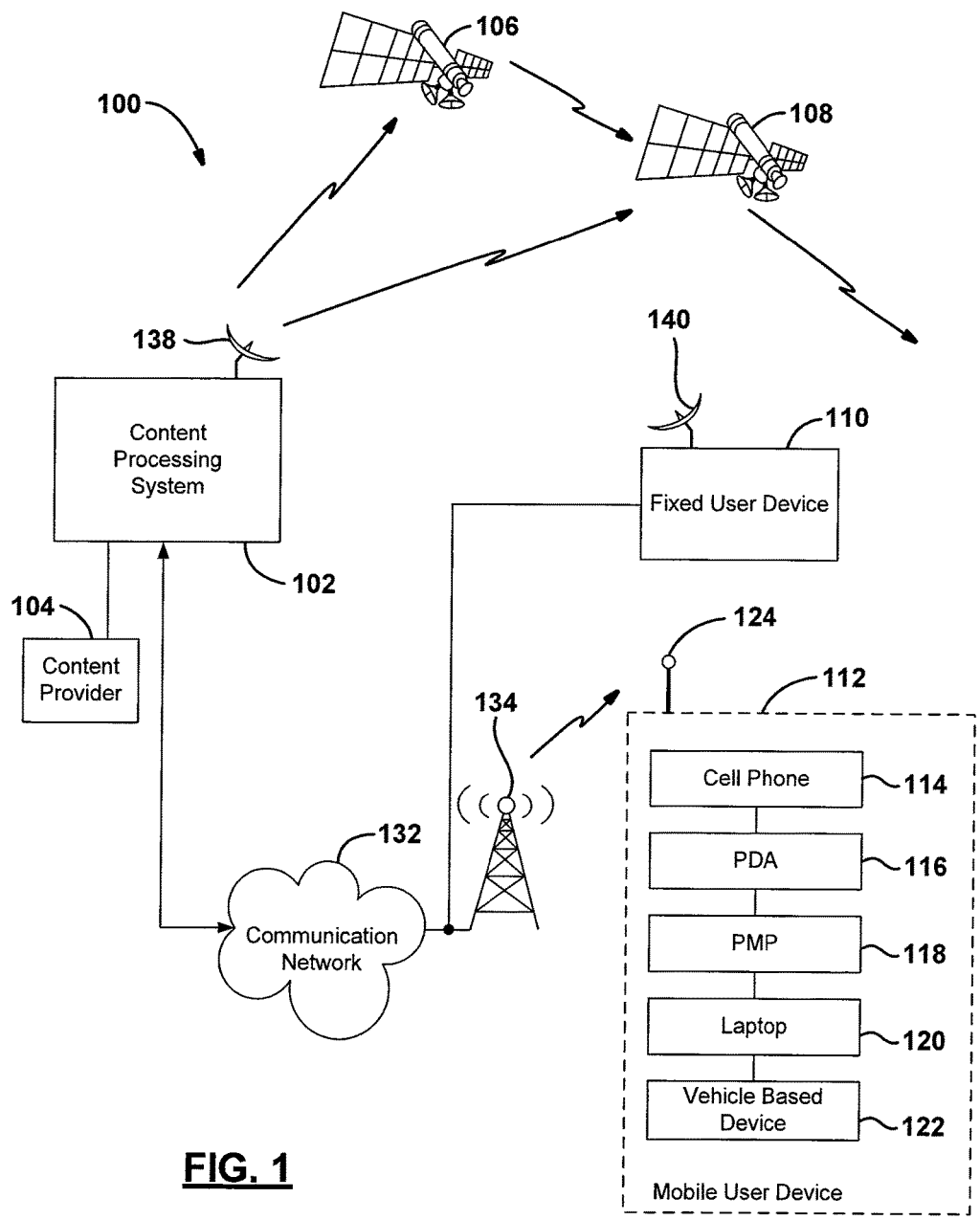
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106,108, one or more of which may be a geosynchronous or geo-stationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
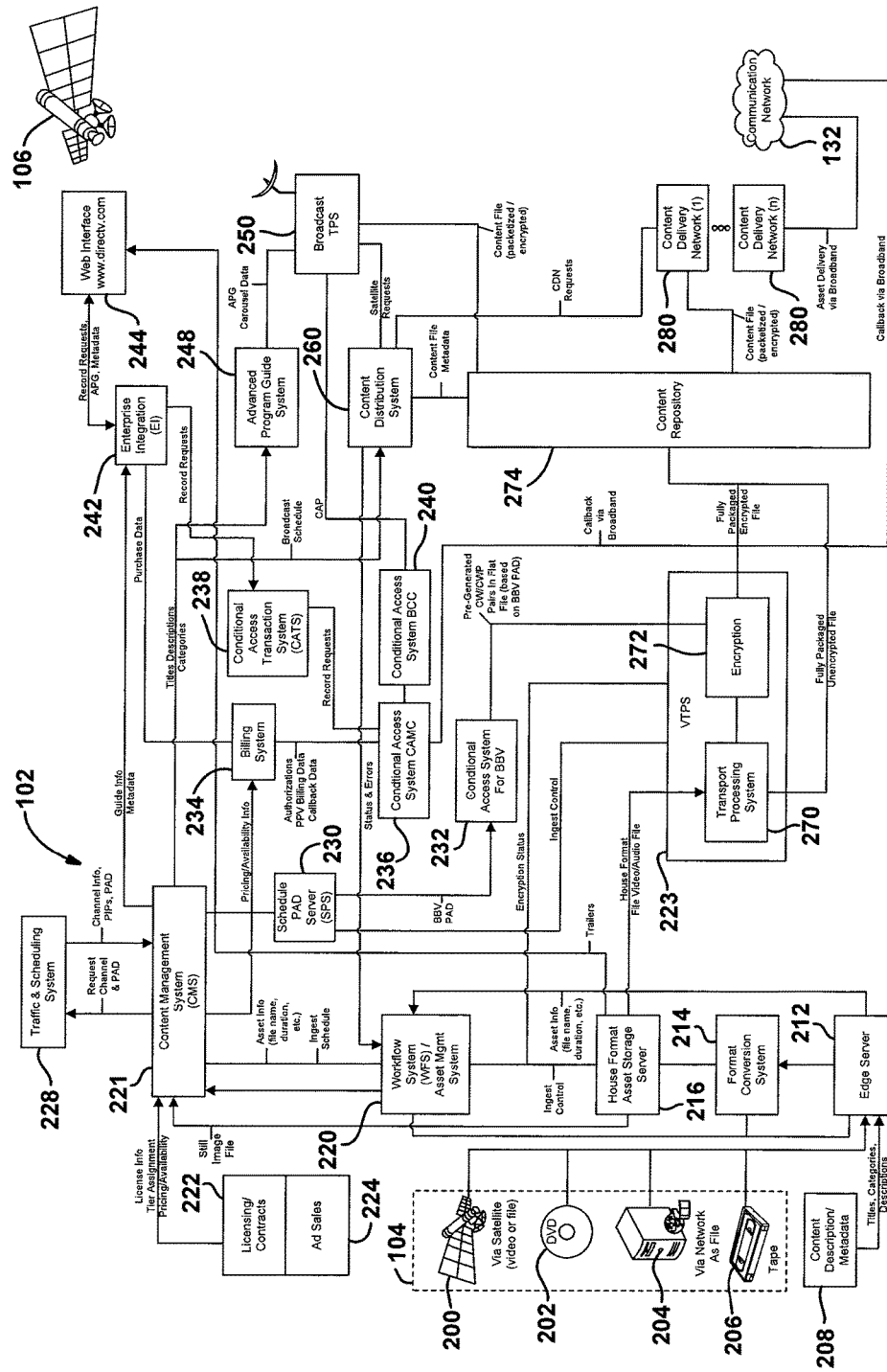
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide a content description and other metadata 208 to the system. The metadata may include various types of information including a description of the content, the originating network of the content, if applicable, the location of the content, various broadband content graphics, a decryption key, a video preview for the broadband content or a network descriptor. An input server 212 may receive the various content and associated metadata and convert the format in a format conversion system 214. A house format asset storage server 216 may be used to store the content asset in a house format. Still image files, trailers, and other information may also be stored in the house format asset storage server. These may be part of the metadata. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packets containing the content. The encoder may encode the data into various transport formats such as DIRECTV® proprietary formats, or industry standard formats. The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

The Content Management System (CMS) 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the CMS and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Remote record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate remote record requests to the conditional access transaction system 238. Remote record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Content files may also be provided from the content management system 221 to the content distribution system 260.

Referring back to the video transport processing system 223, the video transport processing system 223 includes a transport packaging system 270. The transport processing system 270 creates pre-packetized unencrypted files. An encryption module 272 receives the output of the transport processing system and encrypts the packets. Fully packaged and encrypted files may also be stored in the content repository 274. Encryption may take place in the data portion of a packet and not the header portion.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD 110 and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, asset files, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

Figure 3:
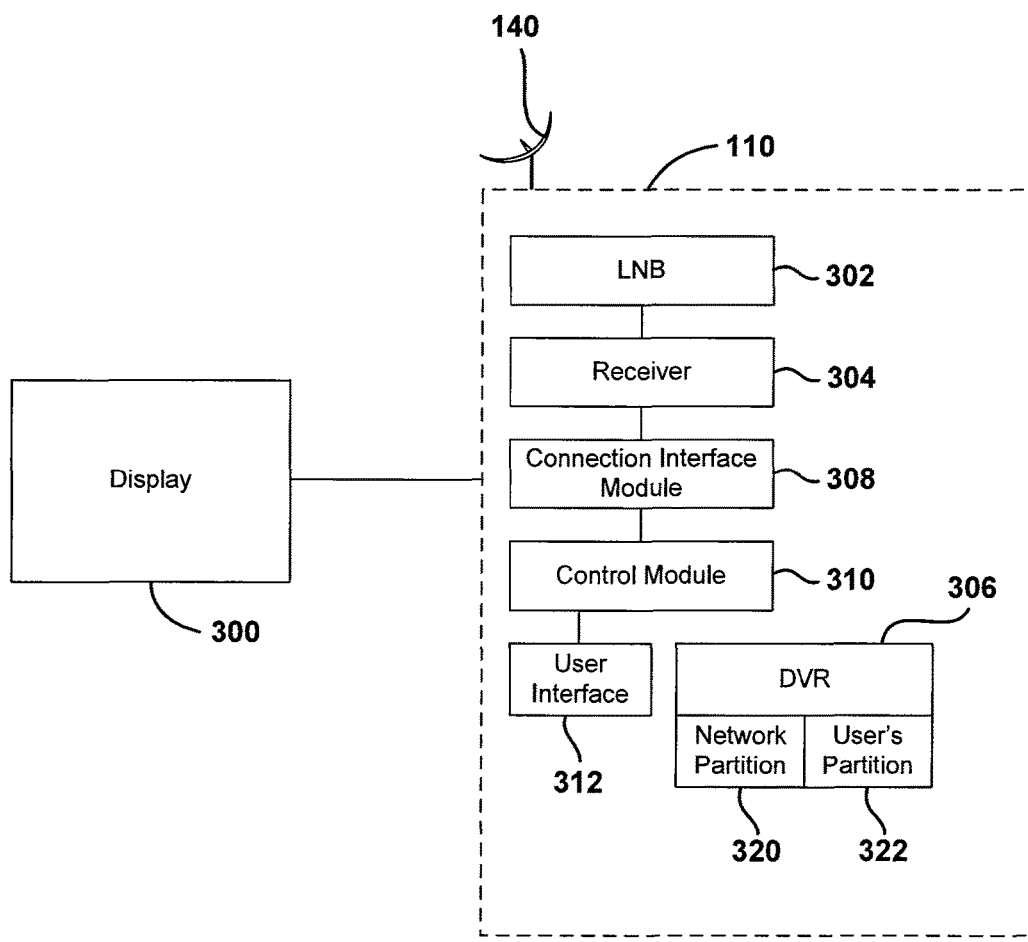
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a recorder 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of storage devices such as a hard disk drive, DVR, or other types of memory devices. The memory device 306 may be used to store the packetized assets and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

Figure 4A:
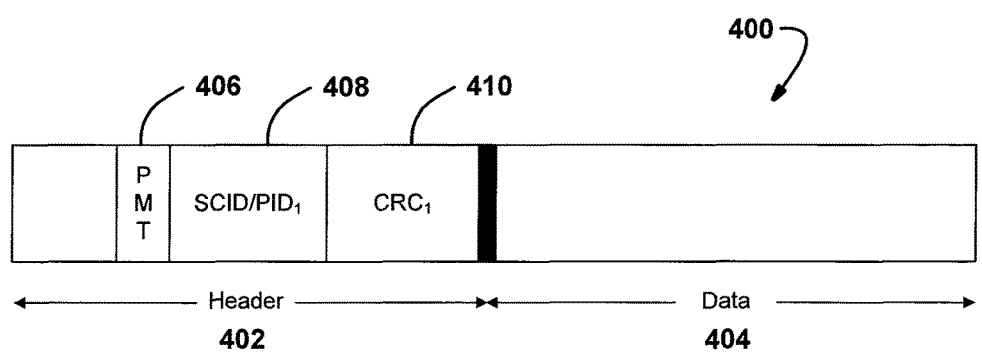
FIGS. 4A and 4B are representational views of packets formed according to the present disclosure.
Figure 4B:
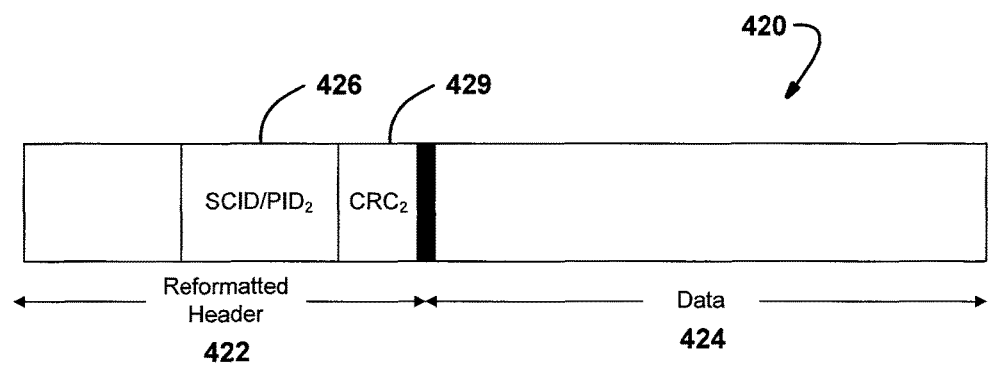

Referring now to FIGS. 4A and 4B, a packet 400 having a header 402 and a data portion 404 is illustrated. The header portion may include a program map table (PMT) 406, an SCID/PID portion 408, and a cyclic redundancy check portion 410. This is representative of the output of the VTPS and the file stored in the content repository. The data portion 404 may be encrypted or not encrypted, while the header portion 402 is preferably not encrypted. A signal may be broadcast from the content distribution network with this type of format.

In FIG. 4B, a second packet 420 having a reformatted header 422 and a data portion 424 is illustrated. The data portion 424 may be unchanged from data portion 404. The reformatted header 422 includes a second SCID/PID 426 that has been changed. The header 426 of the packet 420 has its identification reconfigured so that it may be broadcast by the satellite. Because the SCID/PID is changed, the CRC portion 428 is also changed to conform to this change.

Figure 5:
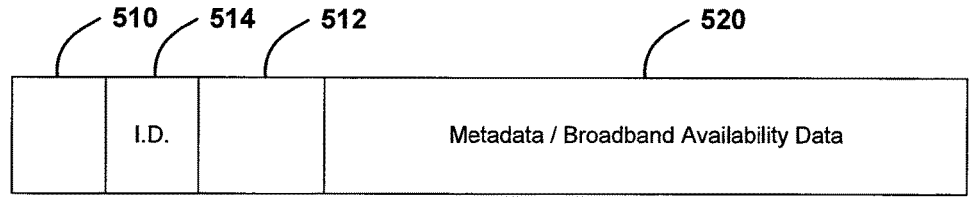
FIG. 5 is a representational view of broadband availability packets or metadata packets formed according to the present disclosure

Referring now to FIG. 5, a broadband content availability data packet 510 is illustrated having a packet header 512 with an identification portion 514. The identification portion identifies the packet as a broadband data packet such as broadband content availability data or metadata. The metadata and the broadband availability data may be one and the same. The packet has a data portion 520 that includes the metadata or the broadband availability data. The metadata may include various types of information including a description of the content, the originating network of the content, if applicable, the location of the content, various broadband content graphics, a decryption key, a video preview for the broadband content or a network descriptor. The metadata may include all or some of the above-mentioned types of data.

Figure 6:
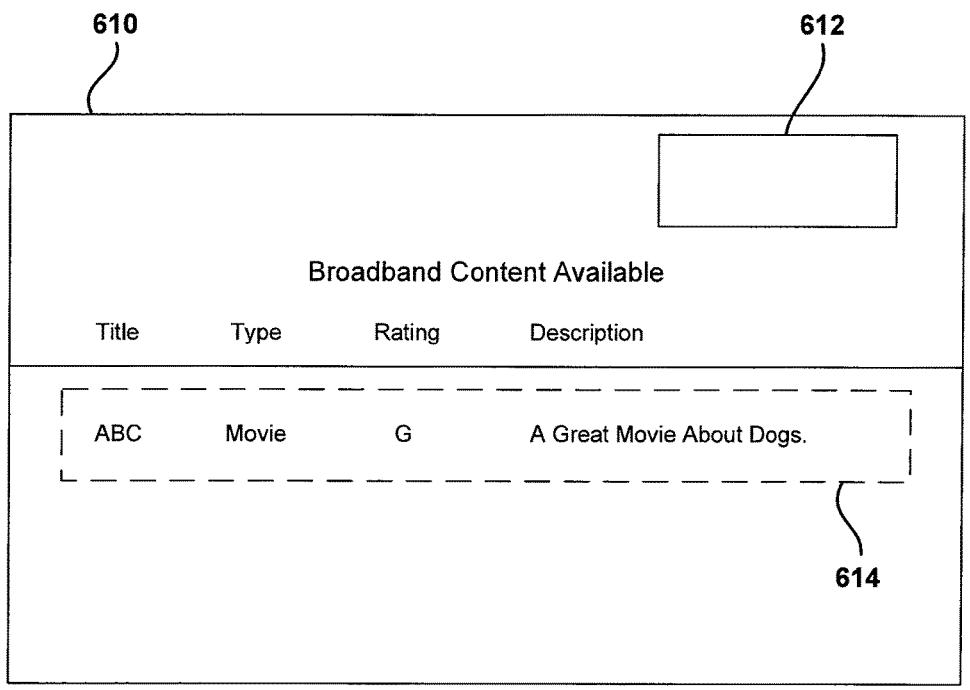
FIG. 6 is a representational view of a screen display form with metadata or broadband availability data according to the present disclosure

Referring now to FIG. 6, an example of a screen display 610 is illustrated. The screen display 610 displaying various types of broadband content available is illustrated. In this example, one title ABC is available. The type of content, such as movie, television show, short film, or the like, may also be displayed. A rating may also be displayed, as well as a short description. A video preview portion 612 may also provide a preview clip of the movie when a cursor 614 is used to select the content. A preview of the particular clip may be displayed in the video display preview area 612 when the cursor 614 is upon or highlighting a title but before a selection. The title, type, rating and description are all examples of metadata that may be communicated through a packet. The packet, corresponding to broadband video information, may be transmitted through various sources, including the satellite. Behind-the-scenes (not displayed) data, such as decryption keys and the content location (which server or service the content is available from), may also be communicated. The description keys may be used to decrypt encrypted broadband content if ordered. Further, various types of graphics and the like used to form the screen display may be illustrated. The broadband content availability display 610 may be formed as part of a program guide or as a separate display or program guide.

Figure 7:
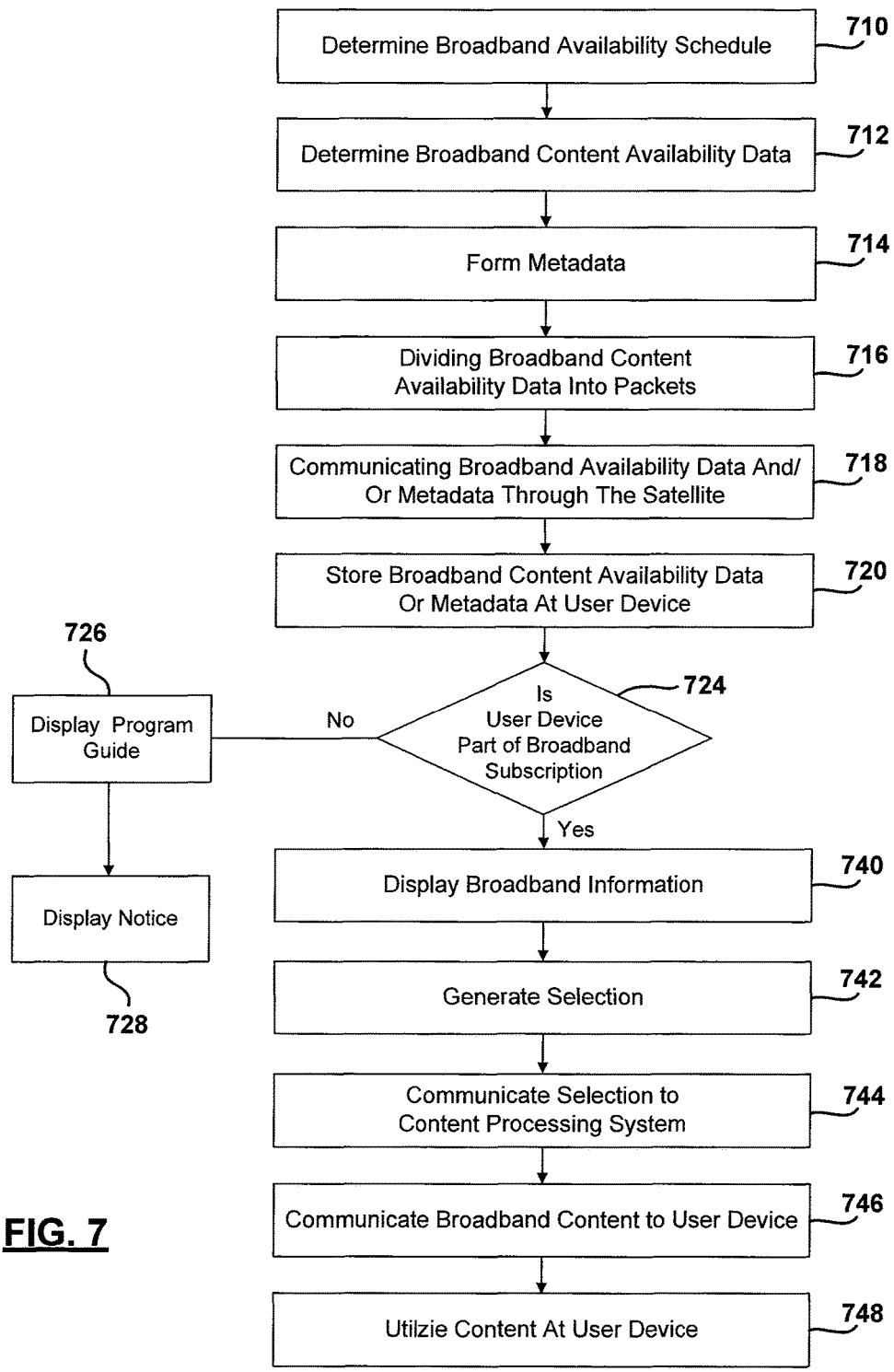
FIG. 7 is a flowchart for communicating broadband availability data through a satellite.

Referring now to FIG. 7, a method of informing users that a particular content is available in the broadband service is set forth. In step 710, broadband availability schedule is determined at the content management system 220. From the broadband availability schedule, broadband content availability data is determined in step 712. In step 714, metadata that may include various types of information as described above is formed. In step 716, the broadband content availability data or metadata or both is divided into packets. In step 718, the broadband availability data and/or the metadata is communicated to the user device or devices through the satellite. In step 720, the broadband content availability data and/or the metadata are stored in the user device.

In step 724, it is determined whether or not the user device is part of the broadband subscription. If the user device is not part of the broadband subscription, step 726 displays the program guide without the broadband subscription information. In addition, step 728 may display a notice that the broadband subscription service is not subscribed to and provides other information about how to obtain the service. Referring back to step 724, if the user device is part of the broadband subscription, step 740 may be performed. In step 740, the broadband information may be displayed on the display of the user device. One example of a display is illustrated in FIG. 6.

The user device may include a user interface associated therewith for generating a selection by pushing buttons on a remote control or buttons associated with the user device. When a selection is performed, step 744 communicates the selection to the content processing system. In step 746, the broadband content is communicated to the user device. The broadband content may be communicated to the user device using various systems, including the satellite system, a terrestrial system, a wireless system, a broadband system, or other types of communication systems.

In step 748, the broadcast content corresponding to the selection may be utilized at the user device. The content may be played in real time or stored within the user device. It is likely that a commercial implementation will store the information in the user device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    generating broadband content availability data for content available to a user device through a broadband network and generating satellite content data for content available to the user device through a satellite;
    dividing the broadband content availability data into broadband content availability packets, each of the broadband content availability packets comprising a header comprising an identification portion identifying a delivery type of the broadband content availability packet as a broadband packet and a data portion comprising a content location identifying a server of a content delivery network from which the content is available;
    communicating the broadband content availability packets and satellite content data to the user device through a satellite;
    selecting broadband content at the user device from the broadband content availability packets to form a selection; and
    communicating content corresponding to the selection to the user device through the broadband network and the server of the content delivery network corresponding to the content location.

2. A method as recited in claim 1 further comprising generating a screen display associated with a user device in response to the broadband availability packets prior to selecting.

3. A method as recited in claim 2 wherein selecting broadband content comprises selecting broadband content from the screen display to form the selection.

4. A method as recited in claim 3 further comprising communicating the selection to a content processing system through a terrestrial network.

5. A method as recited in claim 4 further comprising communicating content corresponding to the selection to the user device through a terrestrial broadband network.

6. A method as recited in claim 4 further comprising communicating content corresponding to the selection to the user device through a wireless broadband network.

7. A method as recited in claim 4 further comprising communicating content corresponding to the selection to the user device through a cable connection.

8. A method as recited in claim 4 further comprising communicating content corresponding to the selection to the user device through a broadband connection.

9. A method as recited in claim 1 wherein the user device comprises a digital video recorder.

10. A method as recited in claim 1 wherein the user device comprises a satellite television set top box.

11. A method as recited in claim 1 wherein the broadband content availability data comprises metadata.

12. A method comprising:
    generating metadata corresponding to broadband content for content available to a user device through a broadband network, said metadata comprising a header portion comprising a delivery type identification portion identifying a delivery type of a broadband content availability packet as a broadband packet and a data portion comprising a content location corresponding to a server of a content delivery network from which the broadband content is available;
    generating satellite content data for content available to the user device through a satellite;
    communicating the metadata comprising the delivery type identification portion to a user device through the satellite;
    selecting a selection at the user device corresponding to a first broadband content in response to the metadata;
    communicating the selection to a content source; and
    communicating the first broadband content to the user device through a broadband communication network and the server of the content delivery network corresponding to the content location.

13. A method as recited in claim 12 wherein the metadata comprises a broadband content description.

14. A method as recited in claim 12 wherein the metadata comprises broadband content graphics.

15. A method as recited in claim 12 wherein the metadata comprises a decryption key.

16. A method as recited in claim 12 wherein the metadata comprises a video preview for the broadband content.

17. A method as recited in claim 12 wherein the metadata comprises a broadband content description, broadband content graphics, decryption key, video preview for the broadband content and the network descriptor.

18. A method as recited in claim 12 further comprising generating a screen display in response to the metadata.

19. A method as recited in claim 12 further comprising prior to generating a screen display, determining subscription data.

20. A method as recited in claim 12 further comprising when the user device is not subscription enabled, generating a display not including the metadata.

21. A method as recited in claim 12 wherein communicating the selection comprises communicating the selection through a terrestrial network.

22. A method as recited in claim 12 wherein communicating the first broadband content comprises communicating the first broadband content through a terrestrial network.

23. A method as recited in claim 12 wherein communicating the first broadband content comprises communicating the first broadband content through a wireless broadband network.

24. A communication system comprising:
a satellite;
a user device;
a content management system generating broadband content availability data corresponding to content available through a broadband network and satellite content data for content available to the user device through a satellite;
a transport processing system communicating the broadband content availability data comprising a header comprising a delivery device type network descriptor to the user device through the satellite, said broadband content availability data comprising a data portion comprising a network descriptor corresponding to a content location identifying a server of a content delivery network from which the content is available;
the user device selecting a selection corresponding to a first broadband content from a screen display associated with the user device corresponding to the broadband content availability data; and
a content processing system receiving the selection and communicating the first broadband content to the user device through the broadband network and the server of the content delivery network.

25. A communication system as recited in claim 24 wherein the user device forms a selection corresponding to a first broadband content in response to the metadata.

26. A communication system as recited in claim 24 further comprising a terrestrial network communicating the selection to a content source.

27. A communication system as recited in claim 26 wherein the terrestrial network communicates the first broadband content to a terrestrial wireless network.

28. A communication system as recited in claim 24 wherein a terrestrial broadband network communicates the first broadband content to the user device.

29. A system as recited in claim 24 further comprising a cable connection communicating the first broadband content corresponding to the selection to the user device through the cable connection.

30. A system as recited in claim 24 wherein the user device comprises a digital video recorder.

31. A system as recited in claim 24 wherein the user device comprises a satellite television set top box.

* * * * *